(12) United States Patent
Maegawa

(10) Patent No.: US 6,388,191 B1
(45) Date of Patent: May 14, 2002

(54) DEVICE FOR FIXING A TOP SHELL TO A BOTTOM SHELL IN A PROTECTOR HOUSING

(75) Inventor: Akihito Maegawa, Mie (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/575,462

(22) Filed: May 22, 2000

(30) Foreign Application Priority Data

May 24, 1999 (JP) .......................................... 11-143561

(51) Int. Cl.$^7$ ................................................. H01J 15/00
(52) U.S. Cl. ........................ 174/50; 174/58; 220/4.02; 439/535
(58) Field of Search ................................ 174/48, 50, 53, 174/57, 58, 60, 17 R, 76, 84 R, 72 A, 101; 220/3.6, 3.8, 4.02, 833, 834, 835, 4.23, 4.24; 248/906; 439/535; 29/857, 868, 866; 264/272.11, 272.14, 272.15

(56) References Cited

U.S. PATENT DOCUMENTS

| | | |
|---|---|---|
| 4,045,112 A | 8/1977 | Rodondi et al. |
| 4,348,070 A | 9/1982 | Simon |
| 4,533,199 A | 8/1985 | Feldberg |
| 5,076,460 A * | 12/1991 | Hussell ........................ 220/338 |
| 5,724,730 A | 3/1998 | Tanaka |
| 5,906,044 A * | 5/1999 | Fujii et al. ................... 174/84 X |
| 6,225,557 B1 * | 5/2001 | Fonteneau et al. ............ 174/50 |

FOREIGN PATENT DOCUMENTS

| | | | |
|---|---|---|---|
| DE | 4329117 | 3/1995 | |
| DE | 19517431 | 6/1996 | |
| GB | 2179501 | * 3/1987 | ................... 174/50 |
| JP | 9-129282 | 5/1997 | |
| JP | 9-134748 | 5/1997 | |

* cited by examiner

Primary Examiner—Dean A. Reichard
Assistant Examiner—Dhiru R Patel
(74) Attorney, Agent, or Firm—Greenblum & Bernstein, P.L.C.

(57) ABSTRACT

A top shell is linked to a bottom shell via a hinge portion and is locked to the latter, so that the top shell is prevented from separating from the bottom shell when the hinge portion is broken. The top shell is formed unitarily and in one piece with the bottom shell via the hinge portion. An end portion of the top shell is notched with a semi-circular groove to form a fixing recess, and an end portion of the bottom shell is formed to have a semi-circular projection to form a fixing protrusion. The top shell is then superposed onto the bottom shell, and they are locked by a locking protrusion and a locking recess. At the same time, the fixing protrusion is press-fitted into the fixing recess, so that the top shell is immobilized at a given position relative to the bottom shell.

12 Claims, 4 Drawing Sheets

DEVICE FOR FIXING A TOP SHELL TO A BOTTOM SHELL IN A PROTECTOR HOUSING

BACKGROUND OF THE INVENTION

1. Field of the Invention

The present invention relates to a fixing device used for assembling protector housings that can be mounted in vehicles such as automobiles. Such a protector housing usually includes a top shell and a bottom shell. In known protector housings, the top and the bottom shells are locked by a first locking mechanism and a corresponding second locking mechanism, bound commonly by a hinge portion. The invention concerns, in particular, a device for fixing the top shell to the bottom shell in such a protector housing. To close the protector housing, the top shell is rotated around the axis of the hinge portion and superposed onto the bottom shell. After both shells are arranged at a given position, the first locking mechanism is fitted with the second locking mechanism. However, the hinge portion bridging the top shell and the bottom shell is usually formed of thin gauge material which, when the protector housing is closed, may protrude from the outer frame of the protector housing. In such a configuration, the hinge portion often risks being hit by external forces and becoming broken. The device according to the present invention is designed to prevent such incidents, and holds the top and the bottom shells firmly together, even if the hinge portion is severed. The inventive device thus prevents further degradation of the protector housing.

2. Description of Background Information

The protector housings mentioned above may be electrical connector housings, wire harness housings or the like, which are installed in automobiles or in the unitary parts thereof. Such protector housings usually include a top shell that protects the open top and the inside of the bottom shell, the latter serving as a main container portion. Further, the top shell and the bottom shell are often linked together through a hinge portion integrally constructed with the shells.

FIG. 1A shows a protector housing 1, e.g. wire harness housing, installed in the joint zone S connecting a flat cable FC to electrical cables D. In the protector housing 1, a top shell 2 and a bottom shell 3 are linked through a flexible hinge portion 4 integrally formed with the shells. An end portion of the top shell 2, distal from the end to which the hinge portion 4 is linked, is provided with a locking protrusion 2a having a hook portion 2b. Conversely, the bottom shell 3 is notched at a position corresponding to that of the locking protrusion 2a when closed, thereby forming a locking recess 3a.

FIG. 1B shows how the top shell 2 is closed and locked with the bottom shell 3. In the example, the bottom shell contains the joint zone S connecting a flat cable FC to electrical cables D. The top shell 2 is first rotated about the axis of hinge portion 4, the latter serving as fulcrum, and is superposed onto the bottom shell 3. The locking protrusion 2a is then fitted into the locking recess 3a, while the hook portion 2b is hooked to a housing base 3b.

When the locking protrusion 2a of top shell 2 and the locking recess 3a of bottom shell 3 are fitted together and the hook portion 2b is hooked to housing base 3b, both shells require a certain degree of play or clearance. However, when the top shell 2 is locked as shown in FIG. 1B, this play may form a space K between the locking protrusion 2a and the locking recess 3a. As a result, even after the protector housing is locked, it may still be subjected to horizontal or lateral movements (shown by the arrow in FIG. 1B) caused by vibration or movement of the automobile. These movements may jolt the protector housing and loosen its structure.

As shown in FIG. 1B, the hinge portion 4 is made thin so as to provide flexibility, and protrudes from the outer frame defined by the top shell 2 and the bottom shell 3. Such a construction, however, renders the hinge portion 4 vulnerable to breakage. For instance, this portion may be easily caught by car parts or outer forces, when fitting the housing 1 into automobile bodies. In such a case, the top shell 2 may separate from the bottom shell 3, even if they are locked together.

SUMMARY OF THE INVENTION

In view of the above, a first object of the present invention is to provide a mechanism for preventing the locked top shell of a protector housing from separating from the bottom shell thereof, even if the hinge is broken. A second object of the invention is to provide a mechanism for preventing a loose joint being formed between the top shell and the bottom shell after they have been locked together.

In order to solve the above problems, there is provided a device for fixing together a first shell (e.g. top shell) and a second shell (e.g. bottom shell) in a housing, the first shell being linked unitarily to the second shell via a hinge portion so as to enable an opening and closing movement. The first shell includes a locking protrusion, while the second shell includes a locking recess, so that the locking protrusion and the locking recess can be locked. The second shell further includes at least one fixing protrusion, whereas the first shell includes a corresponding fixing recess. The fixing protrusion is adapted to press-fit into the fixing recess, so that, when the locking protrusion and the locking recess are locked together, they are immobilized by the fixing protrusion and the fixing recess.

In the above device, the first shell and the second shell respectively include an end portion distal to the end portion to which the hinge portion is linked. Preferably, the fixing protrusion is in the form of a semi-circular column projecting from the end portion of the second shell, whereas the corresponding fixing recess is in the form of a complementary semi-circular groove located at the end portion of first shell, such that, when the first shell and the second shell are locked, the fixing protrusion fits into the fixing recess.

There is also provided an electrical connector housing including a first shell and a second shell, the first shell being linked unitarily to the second shell via a hinge portion so as to enable an opening and closing movement. The first shell includes a locking protrusion, and the second shell includes a locking recess, so that the locking protrusion and the locking recess can be locked. The second shell of the electrical connector housing further includes at least one fixing protrusion, and the first shell thereof includes a corresponding fixing recess. The fixing protrusion is adapted to press-fit into the fixing recess, so that, when the locking protrusion and the locking recess are locked together, they are immobilized by the fixing protrusion and the fixing recess.

In the above electrical connector housing, the first shell and the second shell respectively include an end portion distal to the end portion to which the hinge portion is linked. Preferably, the fixing protrusion is in the form of a semi-circular column projecting from the end portion of the second shell, and the corresponding fixing recess is in the form of a complementary semi-circular groove and located at the end portion of the first shell, such that, when the first shell and the second shell are locked, the fixing protrusion fits into the fixing recess.

Further yet, there is provided a wire harness housing including a first shell and a second shell, the first shell being linked integrally to the second shell via a hinge portion so as to enable an opening and closing movement. The first shell includes a locking protrusion, and the second shell includes a locking recess, so that the locking protrusion and the locking recess can be locked. The second shell of the wire harness housing further includes at least one fixing protrusion, and the first shell thereof includes a corresponding fixing recess. The fixing protrusion is adapted to press-fit into the fixing recess, so that, when the locking protrusion and the locking recess are locked together, they are immobilized by the fixing protrusion and the fixing recess.

In the above wire harness housing, the first shell and the second shell respectively include an end portion distal to the end portion to which the hinge portion is linked. Preferably, the fixing protrusion is in the form of a semi-circular column projecting from the end portion of the second shell, and the corresponding fixing recess is in the form of a complementary semi-circular groove and located at the end portion of the first shell, such that, when the first shell and the second shell are locked, the fixing protrusion fits into the fixing recess.

In this manner, the second shell is provided with a fixing protrusion, and the first shell is provided with a fixing recess. When the first shell is locked onto the second shell and fixed, the fixing protrusion press-fits into the fixing recess, so that the first shell is immobilized on the second shell at a given position. Consequently, even if the hinge portion is broken and the first shell is subjected to biasing forces towards the locked side, displacement of the first shell is hindered by the fixing protrusion and fixing recess. Conversely, when the first shell is subjected to biasing forces toward the hinge portion, displacement of the first shell is prevented by the locking protrusion and locking recess. Likewise, separating forces between the two shells are impeded by the fixing protrusion and the locking protrusion. As a result, the first shell is firmly fixed to the second shell, so as to prevent the first shell from slipping-out or falling-off. Nonetheless, the first shell still retains a space for allowing play, after the housing has been locked together. Furthermore, as the fixing protrusion and the fixing recess are press-fitted, the formation of loose joints is effectively avoided.

Typically, the first shell and the second shell include a hinge portion which links both shells, and a respective end portion distal thereto. The fixing protrusion is then formed on the end portion of the second shell, whereas the fixing recess is formed by notching the end portion of the first shell, such that, when the housing is closed, the fixing protrusion fits with the fixing recess.

Preferably, the fixing protrusion is in the form of a semi-circular column projecting from the end portion of the second shell, whereas the fixing recess is in the form of a complementary shaped semi-circular groove. Further, the first shell is rotatable around the axis of the hinge portion. In this structure, the fixing protrusion can easily be fitted into the fixing recess from its notched open side. Moreover, as mentioned above, the fixing protrusion may be in the form of a semi-circular column, whereas the fixing recess may be in the form of a semi-circular groove. This configuration allows both fixing mechanisms to be press-fitted very easily. However, the position at which the fixing protrusion and fixing recess are formed is not limited to the position mentioned above or to that shown in FIG. 2. It may also be provided at another position or at a plurality of positions, taking into account the size of the second shell.

Additionally, the fixing protrusion may extend from an upper surface of the second shell, and the fixing recess may extend outwardly from a side end of the first shell. Also, the fixing protrusion and the fixing recess may be provided at a location spaced from the locking protrusion and the locking recess. The device may also include a pair of the fixing protrusions and a pair of the corresponding fixing recesses, each pair being located on opposite sides of, and spaced apart from, the locking protrusion and the locking recess.

BRIEF DESCRIPTION OF THE DRAWINGS

The above and the other objects, features and advantages of the present invention will be made apparent from the following description of the preferred embodiments, given as non-limiting examples, with reference to the accompanying drawings, in which.

DETAILED DESCRIPTION OF THE PREFERRED EMBODIMENTS

Figure 1A:
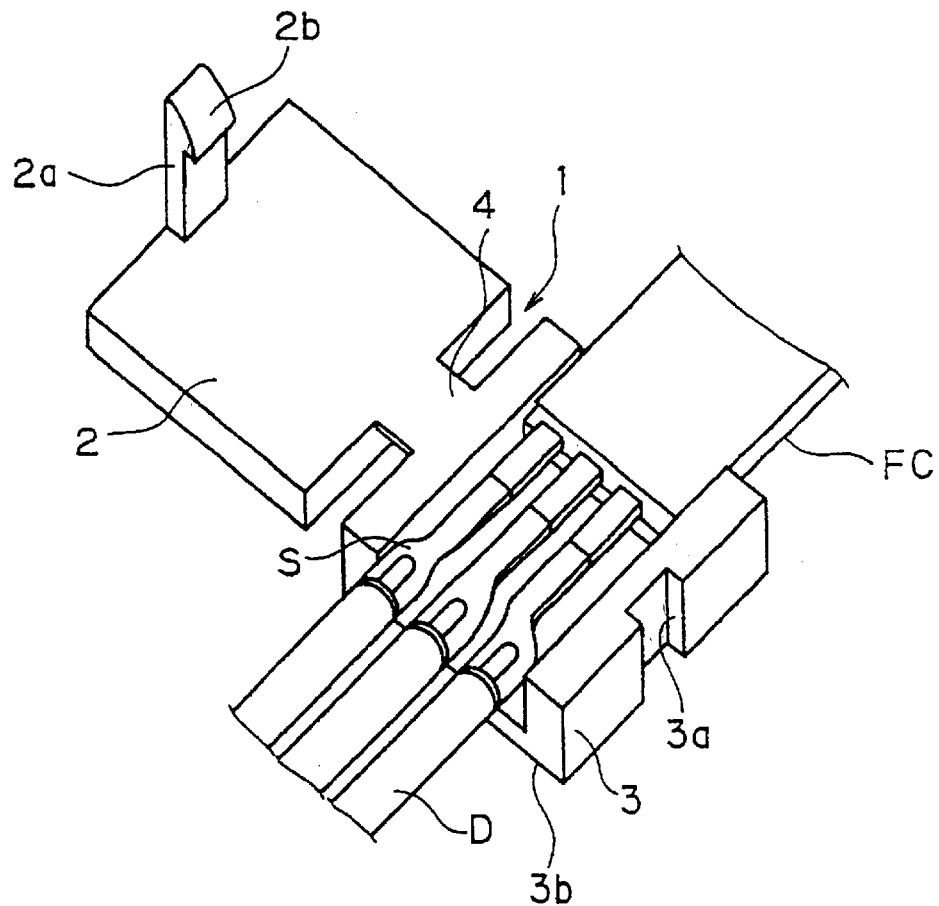
FIG. 1A is a perspective view of a prior art protective housing including a first shell, a second shell and a complementary locking protrusion and recess.
Figure 1B:
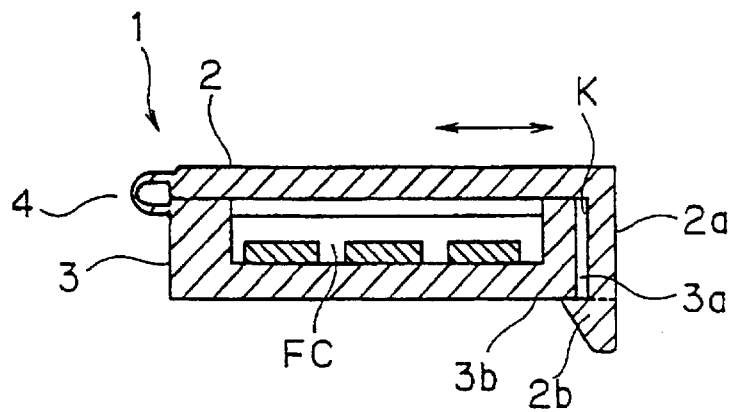
FIG. 1B is a cross-sectional side view of the prior art protective housing of FIG. 1.
Figure 2:
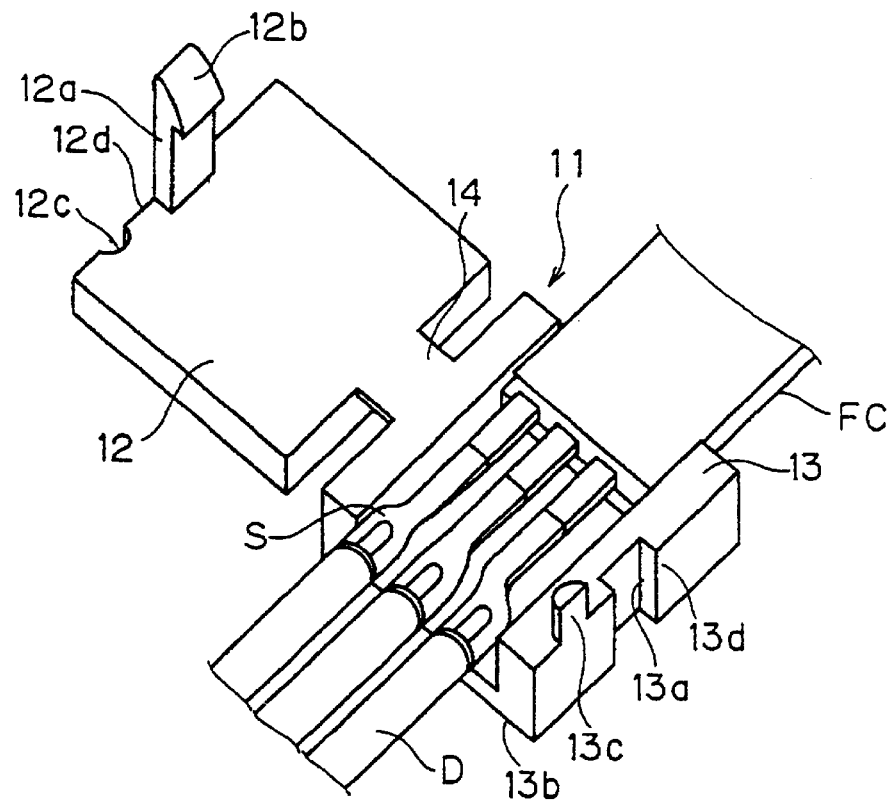
FIG. 2 is a perspective view of a protector housing including a device for fixing a first shell t a second shell according to the invention.
Figure 3:
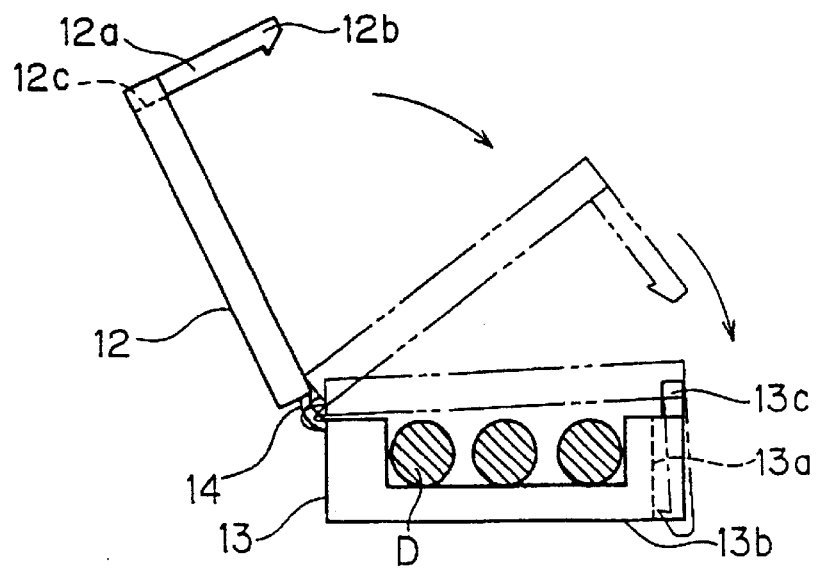
FIG. 3 is a side view of the protector housing of FIG. 2, showing how the first shell is rotated and fixed to the second shell.

FIG. 2 shows a protector housing 11 according to the present invention. The housing 11 includes a first shell (e.g. top shell 12), and a second shell (e.g. bottom shell 13) made of any suitable material, for example, a natural or synthetic resin, and integrally connected through a hinge portion 14 formed unitarily and in one piece with the first and second shells. The hinge portion 14 is made thin so as to retain flexibility. As shown in FIG. 3, the top shell 12 can be closed or opened by rotation about the axis of hinge portion 14, which serves as a fulcrum. The protector housing 11 is designed to contain and protect a joint zone S where a flat cable FC connects to electrical cables D.

Figure 4A:
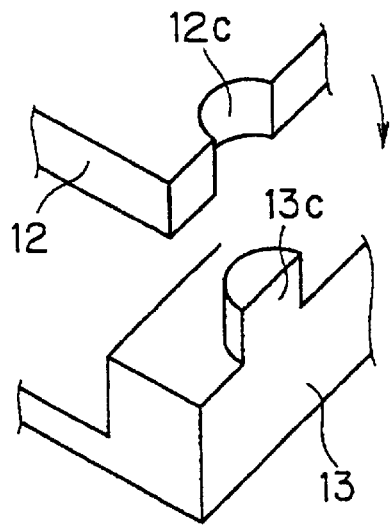
FIG. 4A is a perspective view of a fixing protrusion and a fixing recess of the protector housing of FIG. 2, before they are fitted.

The top shell 12 thus has a first end adjacent the hinge portion 14 and a second end 12d distal thereto. As is known from the prior art, the second end 12d of the top shell 12 is provided with a locking protrusion 12a having a hook portion 12b. The second end is further provided with a fixing recess 12c such as a notch, adjacent, but spaced apart from, the locking protrusion 12a. As shown in FIG. 4(A), the fixing recess 12c is prepared by notching the edge of the second end 12d, so that a generally semi-cylindrical, outwardly spreading recess is formed. The size of the fixing recess 12c is designed such that it neatly engages with a counter-part fixing protrusion 13c as described below, e.g. a tab, formed on the bottom shell 13. Further, the distance between the fixing recess 12c and the locking protrusion 12a can be suitably arranged, depending on, e.g. the size of the protector housing 11.

Likewise, the bottom shell 13 has a first end adjacent the hinge portion 14 and a second end 13d distal thereto. The second end of the bottom shell 13 is provided with a locking recess 12a in a position corresponding to that of the locking protrusion 12a of top shell 12 when the housing 11 is closed. The locking recess 12a is formed by notching the second end 13d in a rectangular shape. There is also provided a fixing protrusion 13c, such as a tab, at a position corresponding to that of the fixing recess 12c when the housing 11 is closed. As shown in FIG. 4(A), the fixing protrusion 13c is in the shape of a column having a generally semi-circular cross-section, which is complementary to the shape of fixing recess 12c. The height of the fixing protrusion 13c corresponds to the thickness of the top shell 12. Furthermore, the radius of the semi-circle is designed such that the fixing protrusion 13c retains a required stiffness.

Figure 4B:
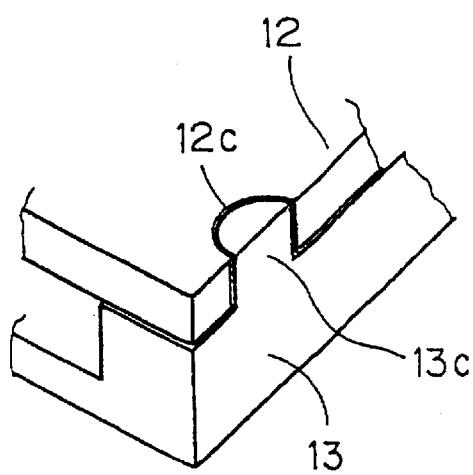
FIG. 4B is a perspective view of the same fixing protrusion and fixing recess, after they have been fitted.

As shown in FIG. 2, the protector housing 11 covers the joint zone S connecting the flat cable FC to the electrical cables D. Then, as shown in FIG. 3, the top shell 12 is rotated onto the bottom shell 13 about the axis of the hinge portion 14 serving as fulcrum, so that the locking protrusion 12a fits into the locking recess 12a and the hook portion 12b is hooked by the housing base 13b. At the same time, the fixing protrusion 13c of bottom shell 13 fits into the fixing recess 12c of top shell 12, as shown in FIGS. 4A and 4B. As the size of the fixing recess 12c is designed to match closely to the external shape of fixing protrusion 13c, the latter must be pressed into the former in order to b engaged. Moreover, the fixing recess 12c is formed by hollowing out the second end 12d of top shell 12, such that the fixing recess 12c flares outwardly. Accordingly, when the top shell 12 is closed along the path shown in FIG. 3, the fixing protrusion 13c can smoothly fit into the fixing recess 12c, without any misalignment.

Figure 5:
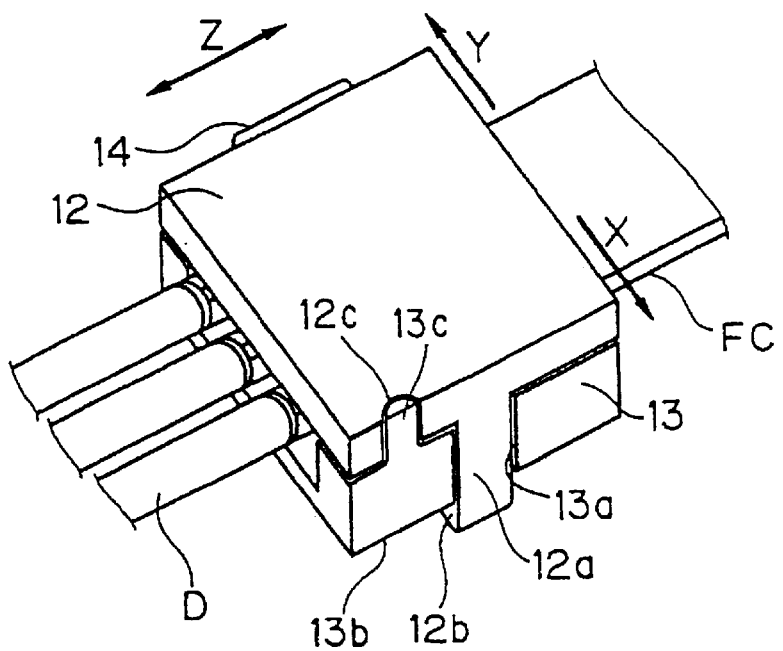
FIG. 5 is a perspective view of the protector housing of FIG. 2, when the first shell and the second shell are locked and fixed.

In FIG. 5, the top shell 12 is locked to the bottom shell 13, while the fixing protrusion 13c is press-fitted into the fixing recess 12c. The locking protrusion 12a and the locking recess 12a are joined while keeping a certain degree of play, as in the prior art. However, as the fixing protrusion 13c and the fixing recess 12c are press-fitted together, the position of the top shell 12 becomes fixed. As a result, in spite of the presence of clearance, the top shell 12 is immobilized and the loose fit of the prior art arrangement can be prevented.

The hinge portion 14 may be broken by, e.g. getting caught with other automobile parts while trying to lock the top shell 12. In such a case, the press-fitting between the fixing protrusion 13c and the fixing recess 12c prevents the top shell 12 from falling off.

Figure 6:
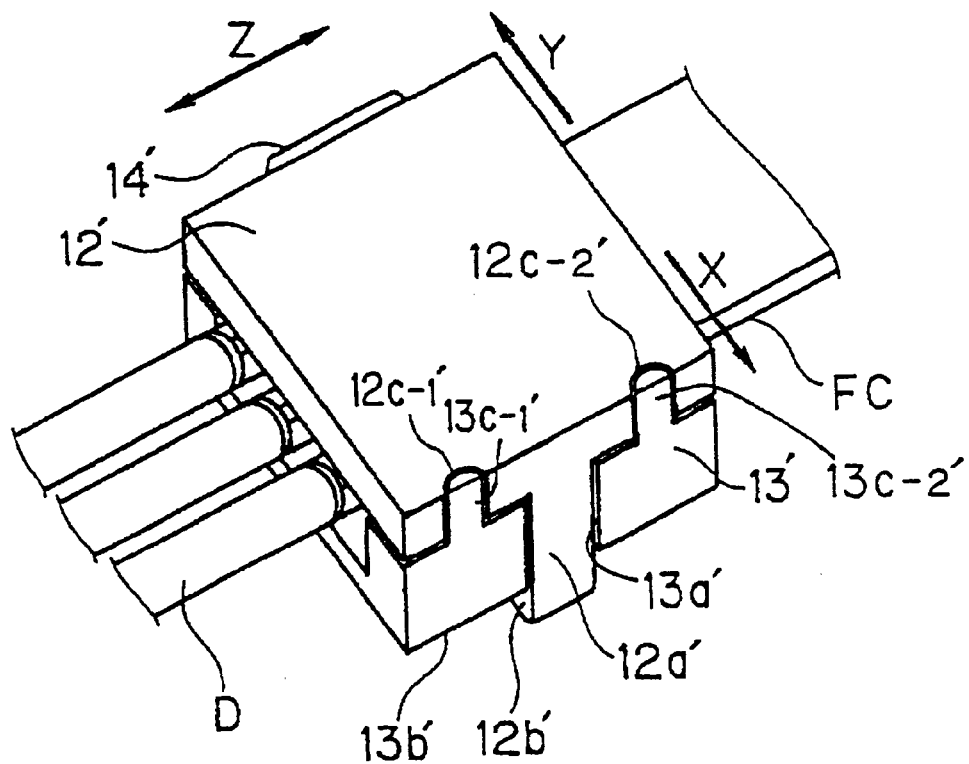
FIG. 6 is a perspective view of a variant protector housing which includes two sets of fixing protrusions and fixing recesses.

In the example illustrated in FIG. 6, such as in cases where the protector housing is used for automobile parts subjected to high degrees of vibration or where its size is too large, there may be provided a pair of second fixing protrusions 13c-1' and 13c-2' with complementary second fixing recesses 12c-1' and 12c-2', both protrusions and recesses flanking a second locking protrusion 12a' and a second locking recess 13a'. The second top shell 12' is rotated onto the second bottom shell 13' about the axis of the second hinge portion 14' serving as the fulcrum, so that the second locking protrusion 12a' fits into the second locking recess 13a' and the second hook portion 12b' is hooked by the second housing base 13b'. Dislodging along the direction X, Y or Z may thus be securely avoided, as well as the falling-off of a second top shell 12' after the damage of a second hinge portion 14'.

However, the fixing recess 12c of top shell 12 and the fixing protrusion 13 of bottom shell 13 are not limited to the configurations disclosed in the foregoing embodiments. They can also be substantially configured to have any shape, for example, rectangular, triangular, etc., and their number can be greater than two, if desired. Furthermore, the device for fixing the top shell 12 and the bottom shell 13 can be used for purposes other than protecting a wire harness housing which covers the joint zone for electrical cables. It may also be used for a receptacle including an upper case and a lower case linked through a hinge, such as an electrical connector housing.

As is understood from the above, when using the device for fixing the top shell and the bottom shell according to the invention, the fixing recess of top shell press-fits with the fixing protrusion of bottom shell, while the top shell is locked onto the bottom shell. The top shell is thus fixed in a predetermined position, so that dislocation of the top shell can be prevented. Moreover, the hinge binding the top shell to the bottom shell may be broken while both shells are locked. Even in such a case, the top shell is immobilized by the above-mentioned fixing devices and locking means, so that the top shell is prevented from falling off.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. HEI 11-143561, filed on May 24, 1999, which is herein expressly incorporated by reference in its entirety.

What is claimed:

1. A device for fixing a first shell and a second shell of a housing, said first shell being integrally linked to said second shell via a hinge portion so as to enable an opening and closing movement;

said first shell including a locking protrusion, and said second shell including a locking recess, so that said locking protrusion and said locking recess can be locked;

said second shell further including at least one fixing protrusion, and said first shell including a corresponding fixing recess, said at least one fixing protrusion being configured to be press-fit into said corresponding fixing recess, so that, when said locking protrusion and said locking recess are locked together, said locking protrusion and said locking recess are immobilized by said at least one fixing protrusion and said corresponding fixing recess;

wherein said first shell and said second shell respectively include an end portion distal to the end portion to which said hinge portion is linked, and said at least one fixing protrusion is in the form of a semi-cylindrical column projecting from said end portion of said second shell, whereas said corresponding fixing recess is in the form of a complementary semi-circular groove and is located at said end portion of said first shell, such that, when said first shell and said second shell are locked together, said at least one fixing protrusion fits into said corresponding fixing recess.

2. The device for fixing a first shell and a second shell in a housing according to claim 1, wherein said at least one fixing protrusion extends from an upper surface of said second shell, and said at least one fixing recess extends outwardly from a side end of said first shell.

3. The device for fixing a first shell and a second shell according to claim 2, wherein said at least one fixing protrusion and said at least one fixing recess are provided at a location spaced from said locking protrusion and said locking recess.

4. The device for fixing a first shell and a second shell according to claim 3, further comprising a pair of said fixing protrusions and a pair of said corresponding fixing recesses, each pair being located on opposite sides of, and spaced apart from, said locking protrusion and said locking recess.

5. An electrical connector housing including a first shell and a second shell, said first shell being integrally linked to said second shell via a hinge portion so as to enable an opening and closing movement;

said first shell including a locking protrusion, and said second shell including a locking recess, so that said locking protrusion and said locking recess can be locked;

said second shell of said electrical connector housing further including at least one fixing protrusion, and said first shell including a corresponding fixing recess, said at least one fixing protrusion being configured to press-fit into said corresponding fixing recess, so that, when said locking protrusion and said locking recess are locked together, said locking protrusion and said locking recess are immobilized by said at least one fixing protrusion and said corresponding fixing recess;

wherein said first shell and said second shell respectively include an end portion distal to the end portion to which said hinge portion is linked, and said at least one fixing protrusion is configured as a semi-circular column projecting from said end portion of said second shell, and said corresponding fixing recess is in the form of a complementary semi-circular groove and is located at said end portion of said first shell, such that, when said first shell and said second shell are locked together, said at least one fixing protrusion fits into said corresponding fixing recess.

6. The electrical connector housing according to claim 5, wherein said at least one fixing protrusion extends from an upper surface of said second shell, and said at least one fixing recess extends outwardly from a side end of said first shell.

7. The electrical connector housing according to claim 6, wherein said at least one fixing protrusion and said at least one fixing recess are provided at a location spaced from said locking protrusion and said locking recess.

8. The electrical connector housing according to claim 7, further comprising a pair of said fixing protrusions and a pair of said corresponding fixing recesses, each pair being located on opposite sides of, and spaced apart from, said locking protrusion and said locking recess.

9. A wire harness housing including a first shell and a second shell, said first shell being integrally linked to said second shell via a hinge portion so as to enable an opening and closing movement;

said first shell including a locking protrusion, and said second shell including a locking recess, so that said locking protrusion and said locking recess can be locked;

said second shell of said wire harness housing further including at least one fixing protrusion, and said first shell thereof including a corresponding fixing recess, said at least one fixing protrusion being configured to be press-fit into said corresponding fixing recess, so that, when said locking protrusion and said locking recess are locked together, said locking protrusion and said locking recess are immobilized by said at least one fixing protrusion and said corresponding fixing recess;

wherein said first shell and said second shell respectively include an end portion distal to the end portion to which said hinge portion is linked, and said at least one fixing protrusion is in the form of a semi-cylindrical column projecting from said end portion of the second shell, and said corresponding fixing recess is in the form of a complementary semi-circular groove and located at said end portion of the first shell, such that, when said first shell and said second shell are locked together, said at least one fixing protrusion fits into said corresponding fixing recess.

10. The wire harness housing according to claim 9, wherein said at least one fixing protrusion extends from an upper surface of said second shell, and said at least one fixing recess extends outwardly from a side end of said first shell.

11. The wire harness housing according to claim 10, wherein said at least one fixing protrusion and said at least one fixing recess are provided at a location spaced from said locking protrusion and said locking recess.

12. The wire harness housing according to claim 11, further comprising a pair of said fixing protrusions and a pair of said corresponding fixing recesses, each pair being located on opposite sides of, and spaced apart from, said locking protrusion and said locking recess.

* * * * *